(12) United States Patent
Oshima et al.

(10) Patent No.: US 6,789,292 B2
(45) Date of Patent: Sep. 14, 2004

(54) HINGE ASSEMBLY

(75) Inventors: Kazuyoshi Oshima, Naruto-machi (JP); Katsuya Imai, Tako-machi (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 0 days.

(21) Appl. No.: 10/311,102

(22) PCT Filed: Mar. 20, 2002

(86) PCT No.: PCT/JP02/02732
§ 371 (c)(1),
(2), (4) Date: Dec. 12, 2002

(87) PCT Pub. No.: WO02/081937
PCT Pub. Date: Oct. 17, 2002

(65) Prior Publication Data

US 2003/0172494 A1 Sep. 18, 2003

(30) Foreign Application Priority Data

Mar. 30, 2001 (JP) ........................................ 2001-097995

(51) Int. Cl.[7] .............................. E05F 1/08; E05D 11/10
(52) U.S. Cl. .............................. 16/297; 16/324; 16/330
(58) Field of Search .......................... 16/324, 303–307, 16/330, 331, 332, 334, 297, 299, 300; 379/428.02, 433.13

(56) References Cited

U.S. PATENT DOCUMENTS

| | | | | |
|---|---|---|---|---|
| 5,168,601 A | * | 12/1992 | Liu | 16/445 |
| 5,586,363 A | * | 12/1996 | Fanuzzi | 16/342 |
| 5,649,309 A | | 7/1997 | Wilcox et al. | 455/90 |
| 5,923,751 A | * | 7/1999 | Ohtsuka et al. | 379/433.13 |
| 5,987,122 A | * | 11/1999 | Daffara et al. | 379/433.13 |
| 6,148,480 A | | 11/2000 | Cooke | 16/303 |

FOREIGN PATENT DOCUMENTS

| | | | | |
|---|---|---|---|---|
| GB | 2355043 A | * | 4/2001 | H04M/1/02 |
| JP | 08-298538 | | 11/1996 | |

(List continued on next page.)

Primary Examiner—Chuck Y. Mah
(74) Attorney, Agent, or Firm—Brown & Michaels, PC

(57) ABSTRACT

A hinge assembly for switching a closed position and an open position of two articles by engagement between a first hinge member which is disposed at one of the two articles such that the first hinge member is non-turnable and non-movable in the axial direction and a second hinge member which is disposed at the other article such that the second hinge member is non-turnable but movable in the axial direction, wherein the locking mechanism comprises a plurality of engagement members disposed between the first hinge member and the second hinge member in such a manner as to be away from each other in the circumferential direction, biasing means for pressing the engagement member against the first hinge member, a guide portion for connecting the engagement members, which are disposed at the first hinge member, such that the engagement members are movable only in the radial direction, and a locking portion, which is disposed at the second hinge member, being raised towards the first hinge member and varied in height along the radial direction, the engagement members being locked by a high part of said locking portion, thereby maintaining the first and second hinge members in the closed position, and wherein movement means moves the engagement members from a high side towards a low side of the locking portion in accordance with movement of the control member, which is externally controlled, from the first position towards the second position side, and the first hinge member is turned to the open position by turning force of the biasing means.

6 Claims, 18 Drawing Sheets

FOREIGN PATENT DOCUMENTS

| | | | | |
|---|---|---|---|---|
| JP | 11-041328 | 2/1999 | | |
| JP | 11062372 A | * 3/1999 | ............ | E05F/1/12 |
| JP | 2000-161336 A | 6/2000 | | |
| JP | 2001-177266 A | 6/2001 | | |
| JP | 2001-207721 A | 8/2001 | | |
| JP | 2001-251396 A | 9/2001 | | |
| JP | 2002303316 A | * 10/2002 | ............ | F16C/11/10 |
| JP | 2002310132 A | * 10/2002 | ............ | F16C/11/04 |
| JP | 2003120651 A | * 4/2003 | ............ | F16C/11/04 |
| JP | 2003202013 A | * 7/2003 | ............ | F16C/11/10 |

* cited by examiner (A)

(B)

(C)

(D)

(A)

(B)

(C)

(A)

(B)

(C)

(A)

(B)

(A)

(B)

(C)

(A)

(B)

(C)

HINGE ASSEMBLY

TECHNICAL FIELD

This invention relates to a hinge assembly used, for example, in a one-touch operation type cellular telephone and capable of turning a reception section of the cellular telephone from a closed position to an open position by one-touch operation.

BACKGROUND ART

Heretofore, there has been known a foldable cellular telephone in which a reception section located in a closed position can be turned into an open position by one-touch operation. Normally, a foldable cellular telephone of this type includes a hinge assembly for turnably connecting a transmission section and a reception section together, a locking mechanism for non-turnably locking the transmission section and the reception section in the closed position and an unlocking mechanism for releasing a locked state achieved by the locking mechanism. When the locked state achieved by the locking mechanism is released by the unlocking mechanism, turn biasing means disposed at the hinge assembly biases the reception section so as to be turned from the closed position to the open position with respect to the transmission section (see Japanese Patent Application Laid-Open No. H08-298538 and Japanese Patent Application Laid-Open No. H11-41328).

In the above-mentioned conventional cellular telephone, the hinge assembly and the locking mechanism are separately provided. Accordingly, it has such problems that manufacturing costs for those separately provided component parts are increased and the number of processes for assembling those component parts to the cellular telephone is increased. Moreover, the conventional locking mechanism has the following problem. Since the reception section is prevented from turning as long as the locked state is released, any undue attempt to turn the reception section from the closed position towards the open position side results in destruction of the locking mechanism.

DISCLOSURE OF THE INVENTION

In order to achieve the above problems, the features of the present invention reside in a hinge assembly comprising a hinge shaft for turnably connecting two articles about a rotation axis between a closed position and an open position, a first hinge member disposed at one of the two articles such that the first hinge member is non-turnable and non-movable in the direction of the rotation axis, a second hinge member placed opposite the first hinge member in the direction of the rotation axis and disposed at the other article such that the second hinge member is non-turnable but movable in the direction of the rotation axis, turn biasing means disposed between the two articles and for turn biasing the two articles from the closed position side towards the open position side, a locking mechanism for non-turnably locking the first and second hinge members so that the two articles are located in the closed position, and a lock releasing mechanism for releasing the locked states of the first and second hinge members caused by the locking mechanism and allowing turning of the first and second hinge members, wherein the locking mechanism includes a plurality of engagement members disposed between the first hinge member and the second hinge member in such a manner as to be away from each other in the circumferential direction about the rotation axis, and direct acting biasing means for biasing the second hinge member towards the first hinge member side along the rotation axis and pressing the second hinge member against the first hinge member through the engagement members, the first hinge member is provided with a guide portion for connecting the engagement members to the first hinge member such that the engagement members are non-turnable but movable in the radial direction, and the second hinge member is provided with a locking portion which is raised towards the first hinge member side and which is varied in height along the radial direction about the rotation axis, the engagement members being locked by a high part of the locking portion, thereby preventing the first and second hinge members from turning from the closed position towards the open position side, and wherein the lock releasing mechanism includes a control member which is externally controllable between a first position and a second position, and movement means for moving the engagement members from a high side towards a low side of the locking portion in accordance with movement of the control member from the first position towards the second position side, the engagement members being able to override the locking wall portion on the low side of the locking portion by biasing force of the turn biasing means.

It is preferred that each of the engagement members is formed of a spherical body.

It is also preferred that the guide portion is formed as a slot extending on a radial line orthogonal to the rotation axis, and the engagement members are received in the slot such that the engagement members are non-movable in the short direction of the slot but movable in the longitudinal direction.

Moreover, it is preferred that the thickness of the first hinge member in the direction of the rotation axis at least at that area where the slot is formed, is smaller than the length of the engagement member in the direction of the rotation axis, one part of the engagement member projects from the slot towards the second hinge member side and the other part of the engagement member projects from the slot towards the opposite side, the movement mean includes a cam member disposed at the opposite side of the second hinge member with respect to the first hinge member and turned about the rotation axis by movement of the control member from the first position to the second position, the cam member has a driving recess formed in an opposing surface thereof with respect to the first hinge member, the driving recess being slanted with respect to the radial line of the first hinge member and co-acted with the slot to move the engagement member from the high part side towards the low part side of the locking wall portion at the time of turning of the cam member.

BRIEF DESCRIPTION OF DRAWINGS

FIG. 5(A) is a plan view thereof, FIG. 5(B) is an enlarged view when viewed in the direction as indicated by an arrow X of FIG. 5(A), and FIGS. 5(C) and 5(D) are sectional views taken on lines Y—Y and Z—Z, respectively, of FIG. 5(B).

FIG. 6(A) is a plan view thereof, FIG. 6(B) is an enlarged view when viewed in the direction as indicated by an arrow X of FIG. 6(A) and FIG. 6(C) is a sectional view taken on line Y—Y of FIG. 6(B).

FIG. 9(A) is a front view thereof, FIGS. 9(B) and 9(C) are views when viewed in the direction as indicated by arrows X and Y, respectively, of FIG. 9(A), and FIG. 9(D) is a sectional view taken along line Z—Z of FIG. 9(C).

FIG. 10(A) is a vertical sectional view thereof, and FIGS. 10(B) and 10(C) are views when viewed in the direction as indicated by arrows X and Y, respectively, of FIG. 10(A).

FIG. 11(A) is a front view thereof, and FIG. 11(B) is a view when viewed in the direction as indicated by an arrow X of FIG. 11(A).

FIG. 12(A) is a plan view thereof, FIG. 12(B) is a view when viewed in the direction as indicated by an arrow X of FIG. 12(A), FIG. 12(C) is a bottom view thereof, and FIG. 12(D) is a sectional view taken on line Y—Y of FIG. 12(A).

FIG. 13(A) is a plan view thereof, FIG. 13(B) is a side view thereof, FIG. 13(C) is a view when viewed in the direction as indicated by an arrow X of FIG. 13(A), and FIG. 13(D) is a sectional view taken on line Y—Y of FIG. 13(A).

FIG. 14(A) is a plan view thereof, FIG. 14(B) is a sectional view taken on line X—X of FIG. 14(A), and FIG. 14(C) is a bottom view thereof.

FIG. 15(A) is a front view thereof, FIG. 15(B) is a vertical sectional front view thereof, and FIG. 15(C) is a view when viewed in the direction as indicated by an arrow X of FIG. 15(A).

BEST MODE FOR CARRYING OUT THE INVENTION

One embodiment will be described hereinafter with reference to FIGS. 1 through 24 in which a hinge assembly according to the present invention is applied between a transmission section (article) and a reception section (article) of a foldable cellular telephone. It should be noted here that the hinge assembly according to the present invention is also applicable to other two articles, which are to be turnably connected to each other, than the transmission section and the reception section of the cellular telephone.

Figure 3:
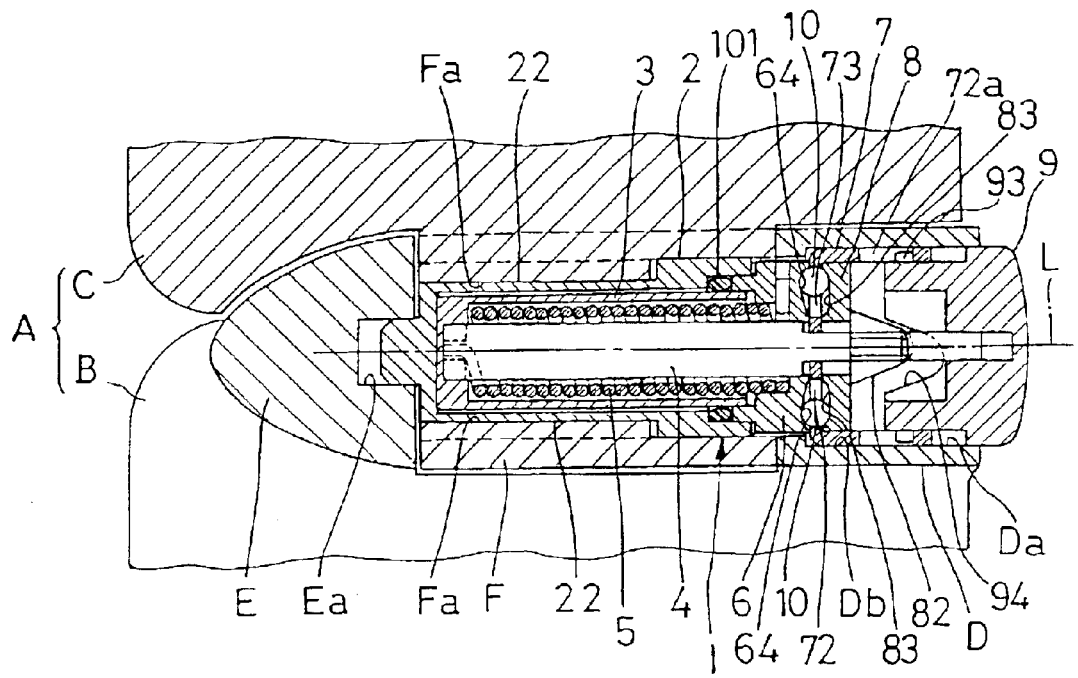
FIG. 3 is a sectional view taken on line X—X of FIG. 24, showing a state in which the reception section is turned into the open position.
Figure 5:
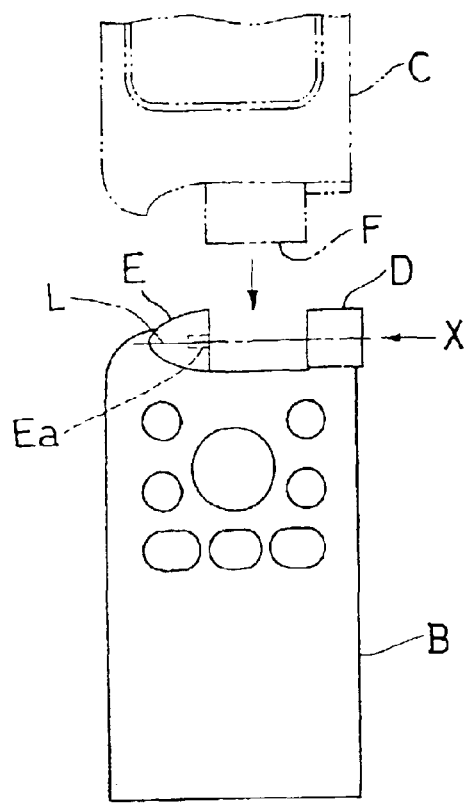
FIG. 5 is a view showing a transmission section of a cellular telephone to which the present invention is applied.
Figure 5:
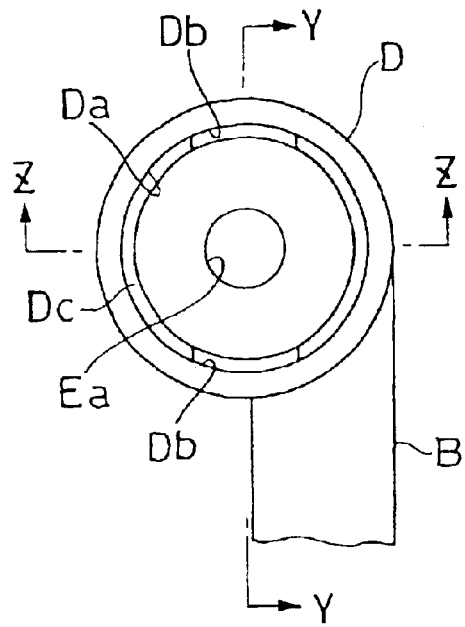
Figure 5:
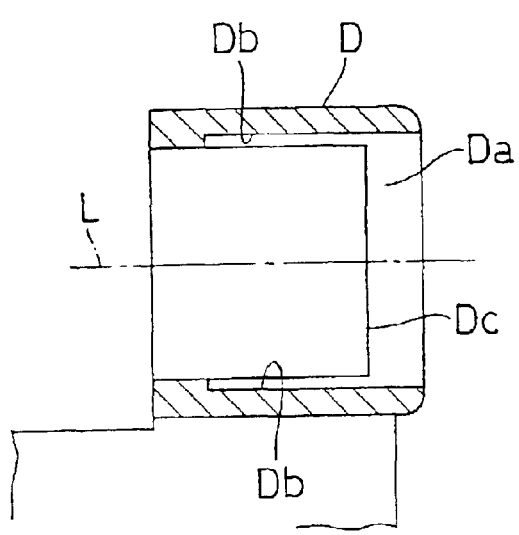
Figure 5:
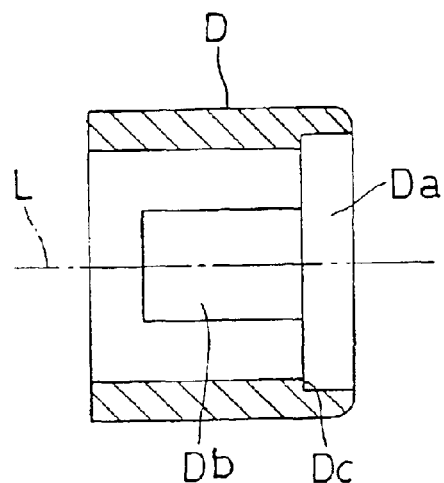

As shown in FIG. 3, the cellular telephone A includes a transmission section B and a reception section C turnably connected about a rotation axis L. As shown in FIG. 5, first and second hinge retainers D, E with their axes aligned with the rotation axis L are formed at that end portion of the transmission section B which is located on the reception section C side, in such a manner as to be away from each other in the direction of the rotation axis L. The first hinge retainer D is formed in a circular cylindrical configuration. On the inner peripheral surface of the first hinge retainer D, an enlarged diameter hole portion Da is formed in its outer end portion and a pair of guide grooves Db, Db extending in parallel with the rotation axis L from the enlarged diameter hole portion Da towards its inner end portion side are formed in such a manner as to be 180 degrees away from each other in the circumferential direction. The second hinge retainer E is of a solid circular cone-like configuration and has a support hole Ea formed in a central area of its end face directed to the first hinge retainer D side.

Figure 6:
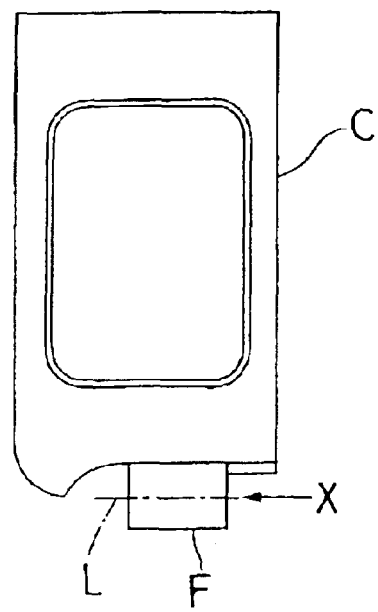
FIG. 6 is a view showing a reception section of the cellular telephone to which the present invention is applied.
Figure 6:
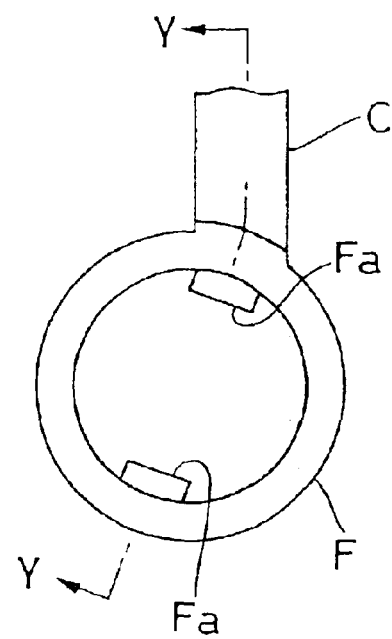
Figure 6:
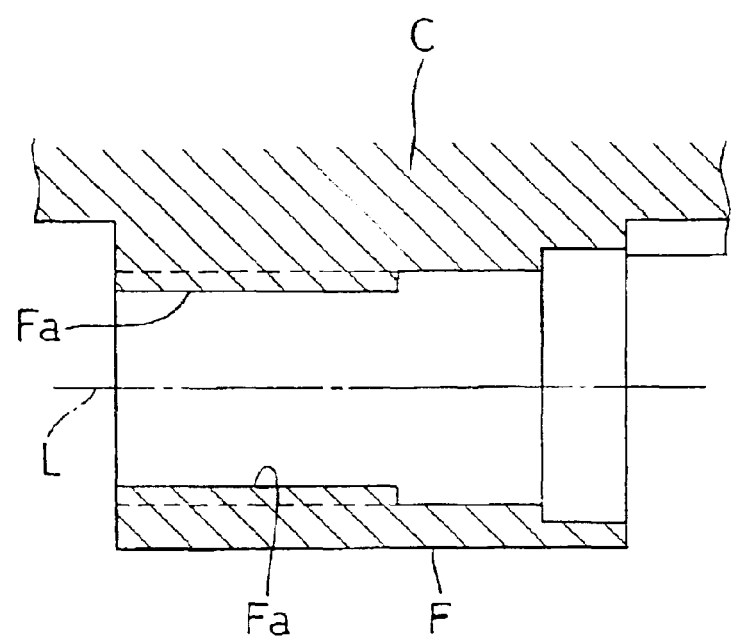

As shown in FIG. 6, a third hinge retainer F with its axis aligned with the rotation axis L is formed on that end portion of the reception section C which is located on the transmission section B side. This third hinge retainer F has a length generally equal to an interval between the first hinge retainer D and the second hinge retainer E and is inserted therebetween. A pair of key portions Fa, Fa extending along the rotation axis L is formed on the inner peripheral surface of the third hinge retainer F. Each key portion Fa extends from a generally central part in the longitudinal direction of the third hinge retainer F to that end face of the third hinge retainer F which is located on the second hinge retainer E side.

The first and second hinge retainers D, E and the third hinge retainer F are turnably connected to each other about the rotation axis L through a hinge assembly 1 according to the present invention. As a consequence, the transmission section B and the reception section C are turnably connected to each other about the rotation axis L.

That is, the hinge assembly 1 chiefly comprises, as shown in FIGS. 1 through 4, 7 and 8, a connection sleeve (hinge shaft) 2, a receiving sleeve 3, a connection shaft 4, a coiled spring 5, a movable member (second hinge member) 6, a fixed member (first hinge member) 7, a cam member (moving means) 8, and a control button (control member) 9.

Figure 1:
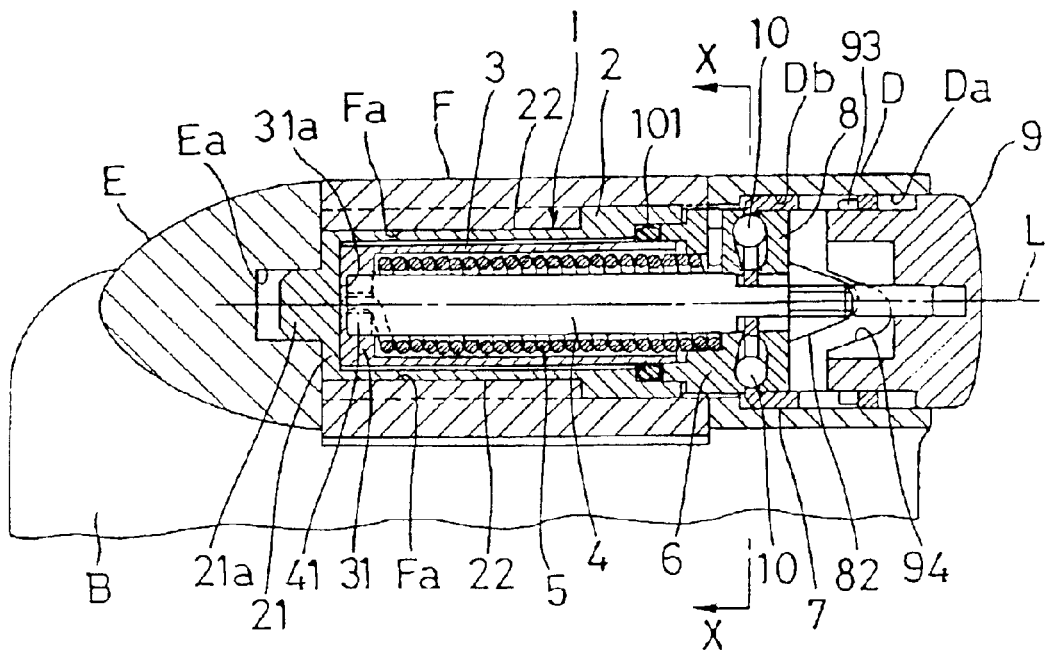
FIG. 1 is a view showing one embodiment in which the present invention is applied to a cellular telephone and is a sectional view taken on line X—X of FIG. 19, showing a state in which a reception section is turned into the closed position and the control button is located in its original position.
Figure 2:
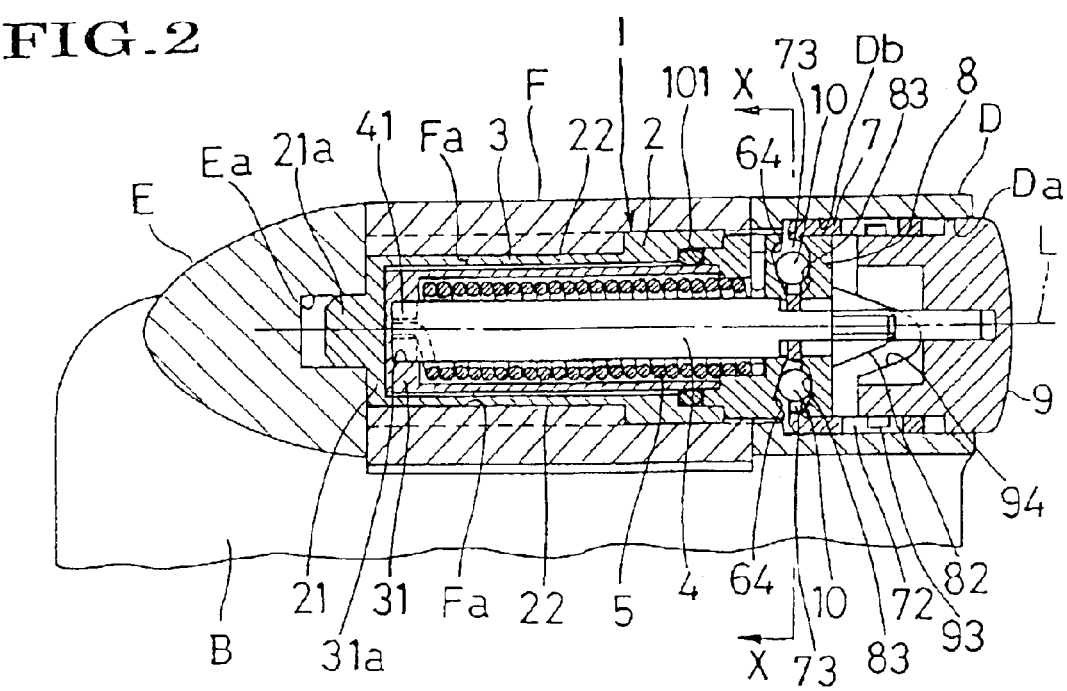
FIG. 2 is a sectional view, like FIG. 2, but showing a state in which the control button is pressed.
Figure 4:
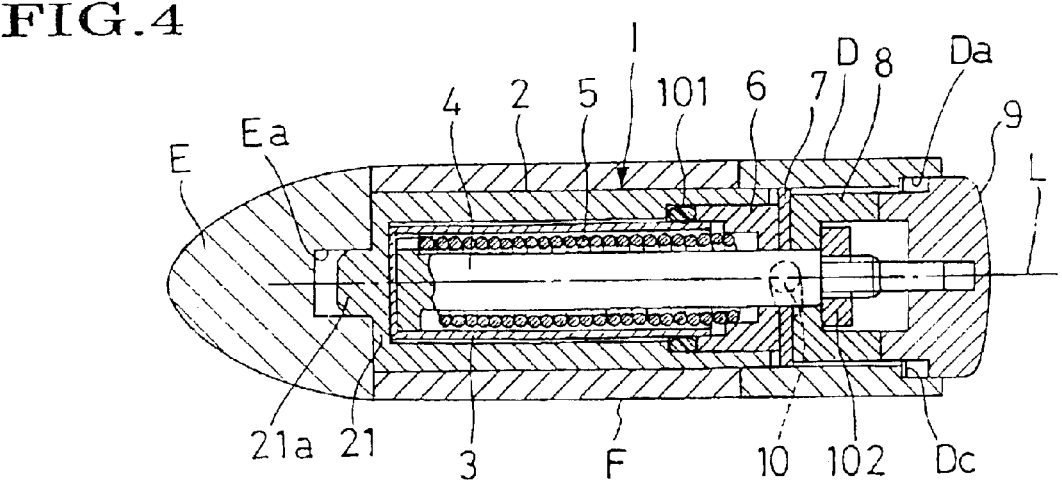
FIG. 4 is a sectional view taken on line Y—Y of FIG. 19.
Figure 7:
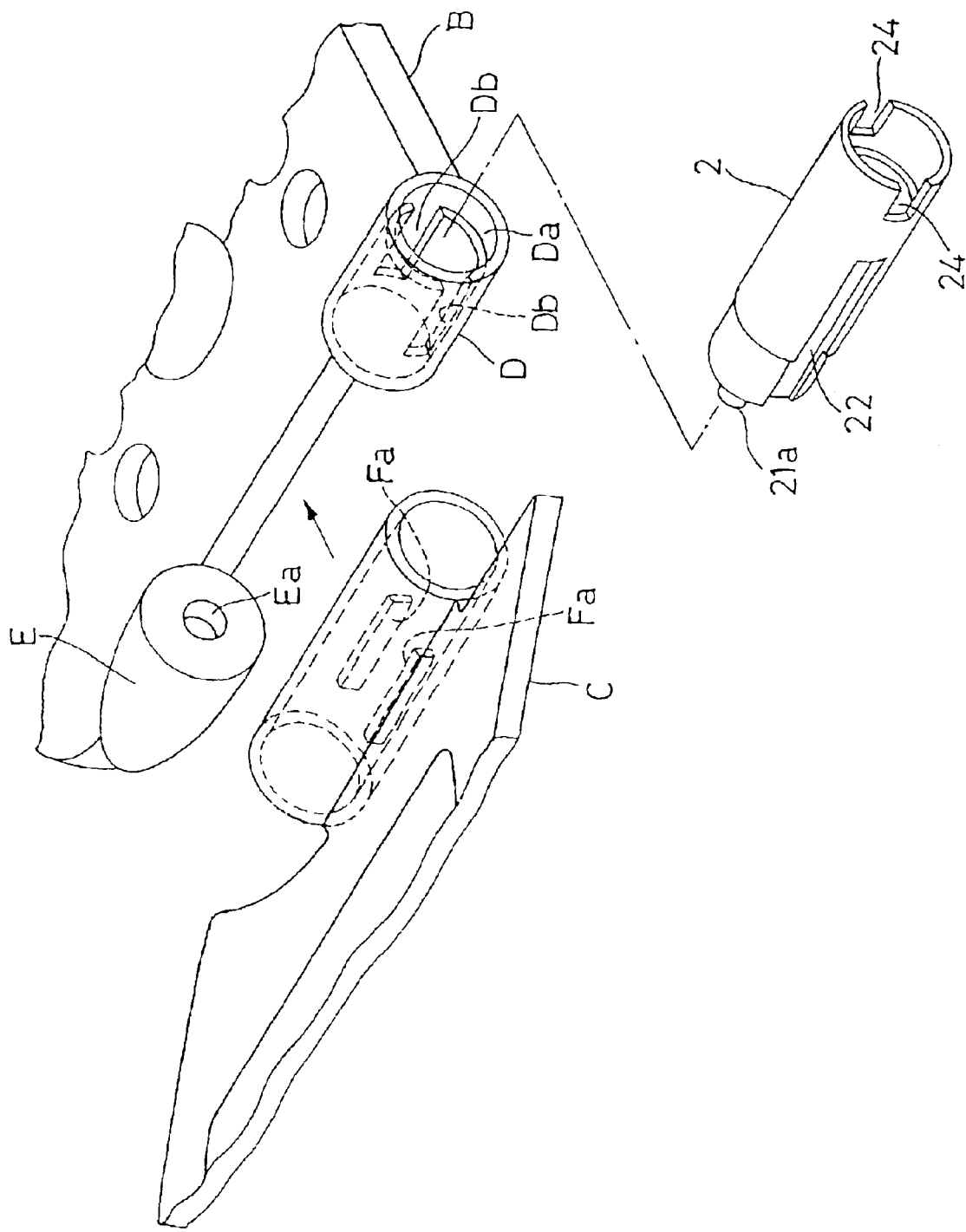
FIG. 7 is an exploded perspective view showing essential portions of the transmission section and the reception section of the cellular telephone to which the present invention is applied, and a connection sleeve of a hinge assembly according to the present invention.
Figure 8:
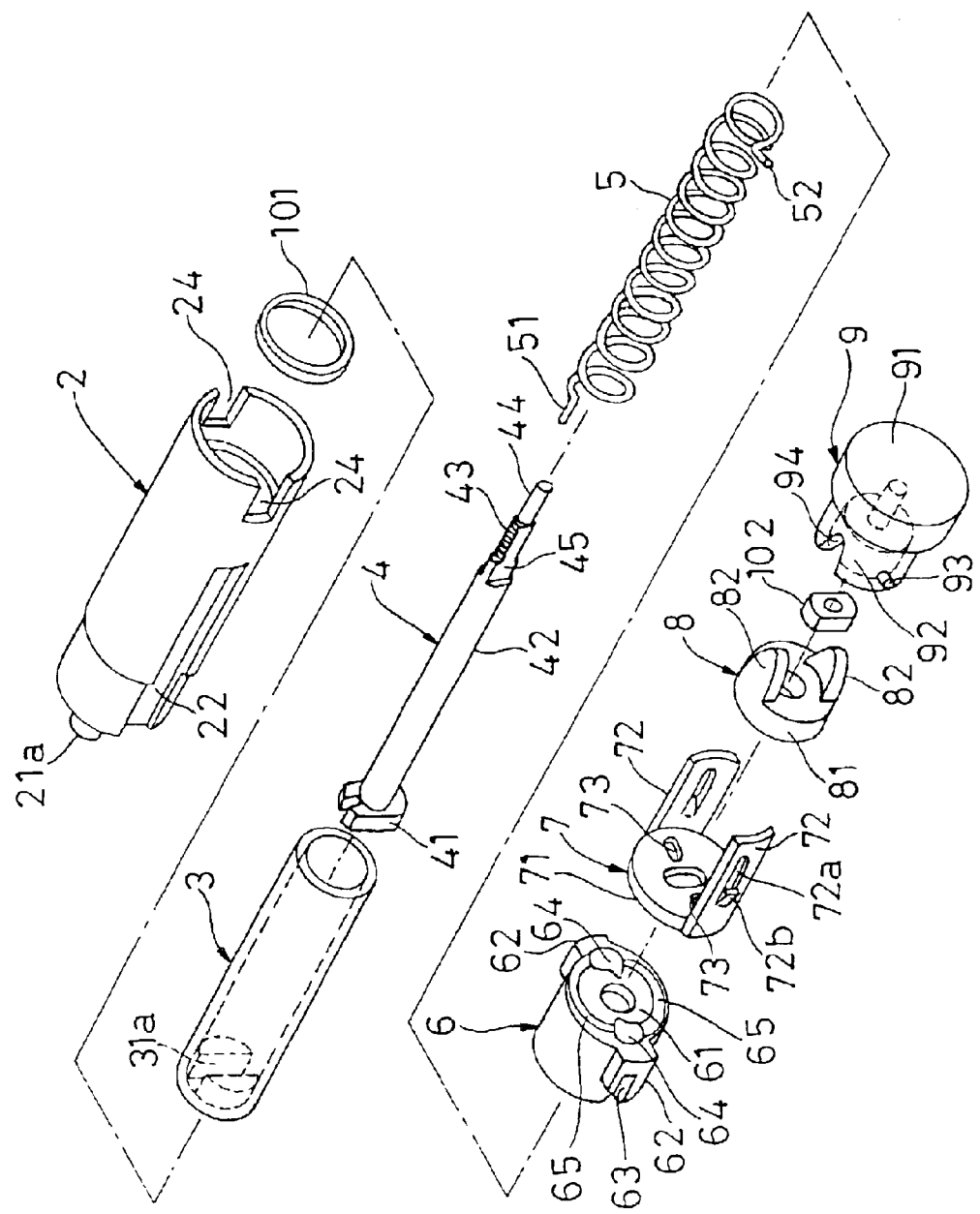
FIG. 8 is an exploded perspective view of the hinge assembly according to the present invention.
Figure 9:
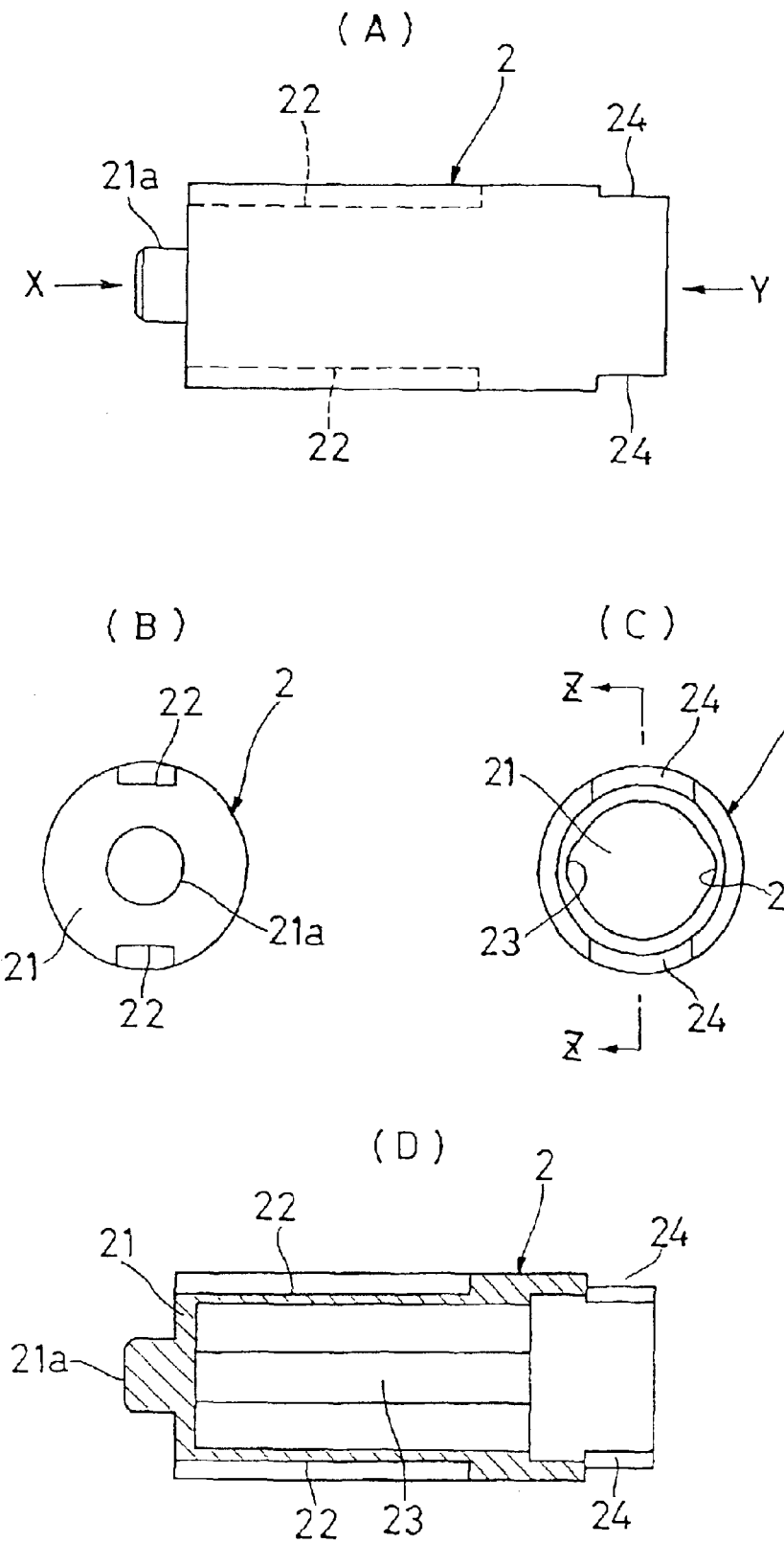
FIG. 9 is a view showing the connection sleeve of the hinge assembly according to the present invention.

As shown in FIGS. 7 through 9, the connection sleeve 2 is provided at one end thereof with a bottom portion 21 and open at the other end, thus exhibiting a circular cylindrical configuration with a bottom. The connection sleeve 2 is inserted in the third hinge retainer F. As shown in FIGS. 1 through 3, the connection sleeve 2 is non-turnably connected to the third hinge retainer F with the key portions Fa, Fa fitted into key grooves, 22, 22 which are formed in its outer peripheral surface. A connection projection 21a having a circular configuration in section is formed on a central area of the outer end face of the bottom portion 21 of the connection sleeve 2. This connection projection 21a is turnably fitted to the support hole Ea of the second hinge retainer E. As shown in FIG. 4, the end portion on the opening portion side of the connection sleeve 2 projects from the third hinge retainer F and is turnably fitted to the end portion of the first hinge retainer D. As described in the foregoing, the connection sleeve 2 is non-turnably fitted to the third hinge retainer F and the opposite end portions of the connection sleeve 2 are turnably fitted to the first and second hinge retainers D, E. By doing so, the first and second hinge retainers D, E and the third hinge retainer F are turnably connected to each other through the connection sleeve 2, and thus, the transmission section B and the reception section C are turnably connected to each other about the rotation axis L. The transmission section B and the reception section C are restricted in turning range between the closed position (folded position) where front faces of the transmission section B and the reception section C are in abutment relation and the open position turned about 160 degrees from the closed position.

Figure 10:
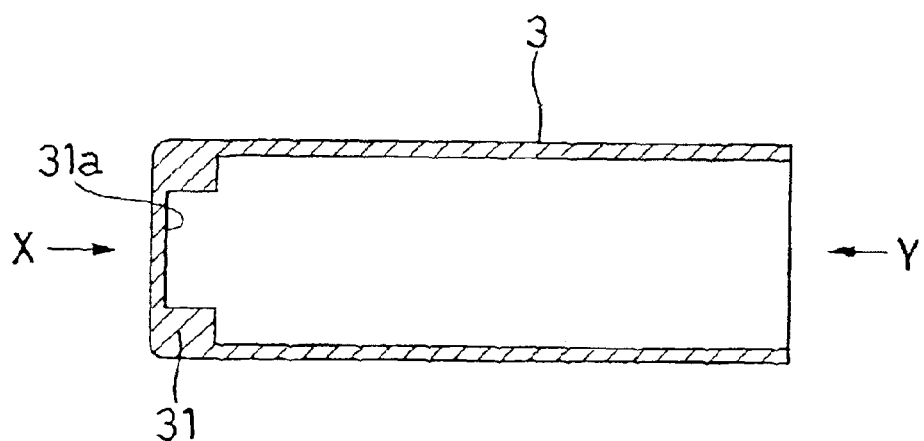
FIG. 10 is a view showing a receiving sleeve of the hinge assembly according to the present invention.
Figure 10:
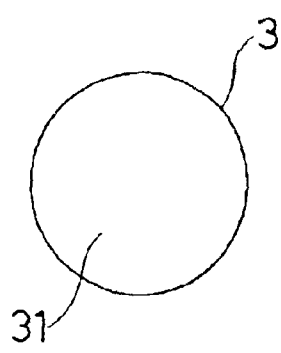
Figure 10:
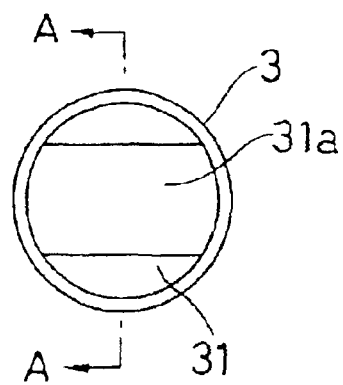

The receiving sleeve 3 is turnably inserted in the connection sleeve 2 with a small gap left therebetween. The receiving sleeve 3, as shown in FIG. 10, has a bottom portion 31 at its end portion on the bottom portion 21 side of the connection sleeve 2, and is open at its other end portion, thereby exhibiting a circular sleeve-like configuration in section. A viscous fluid such as silicon oil or the like is filled in a gap between the outer peripheral surface of the receiving sleeve 3 and the inner peripheral surface of the connection sleeve 2. Owing to this feature, a high-speed rotation between the connection sleeve 2 and the receiving sleeve 3 is prohibited and thus, a high-speed turning between the transmission section B and the reception section C is prohibited. The fluid filled between the inner peripheral surface of the connection sleeve and the outer peripheral surface of the receiving sleeve 3 is prevented from leaking outside by a seal member 101 such as an O-ring or the like. The seal member 101 is prevented from escaping by a movable member 6 as later described. Shallow recesses 23, 23 are formed in the inner peripheral surface of the connection sleeve 2. Those shallow recesses 23, 23 are for pooling the viscous fluid therein.

Figure 11:
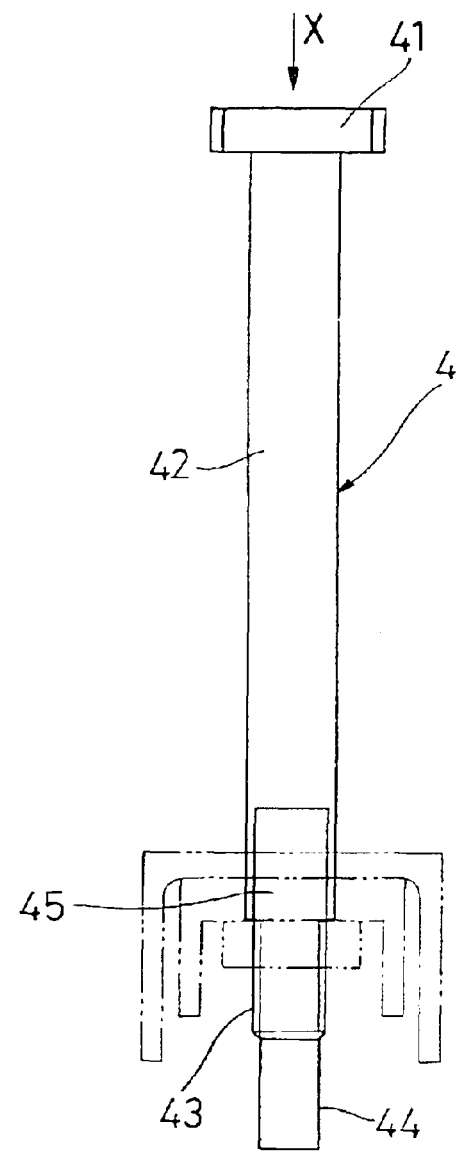
FIG. 11 is a view showing the connection shaft of the hinge assembly according to the present invention.
Figure 11:
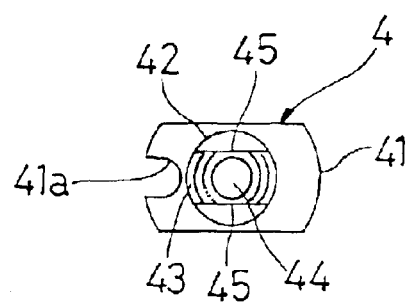

The connection shaft 4 is inserted in the receiving sleeve 3. This connection shaft 4, as shown in FIG. 11, includes an oval head portion 41, a shaft portion 42 having a circular configuration in section, a male screw portion 43 having a diameter slightly smaller than that of the shaft portion 42, and a press-fit shaft portion 44 having a diameter slightly smaller than that of the male screw portion 43. Those components are coaxially formed. The head portion 41 is fitted into a lateral groove 31a formed in the inner surface of the bottom portion 31 of the receiving sleeve 3 and extending in the radial direction. Owing to this arrangement, the connection shaft 4 is non-turnably connected to the receiving sleeve 3. A double face portion 45 having a pair of planar portions parallel to the rotation axis L is formed on the outer peripheral surface of that end portion of the shaft portion 42 which is located on the male screw portion 43 side.

Figure 12:
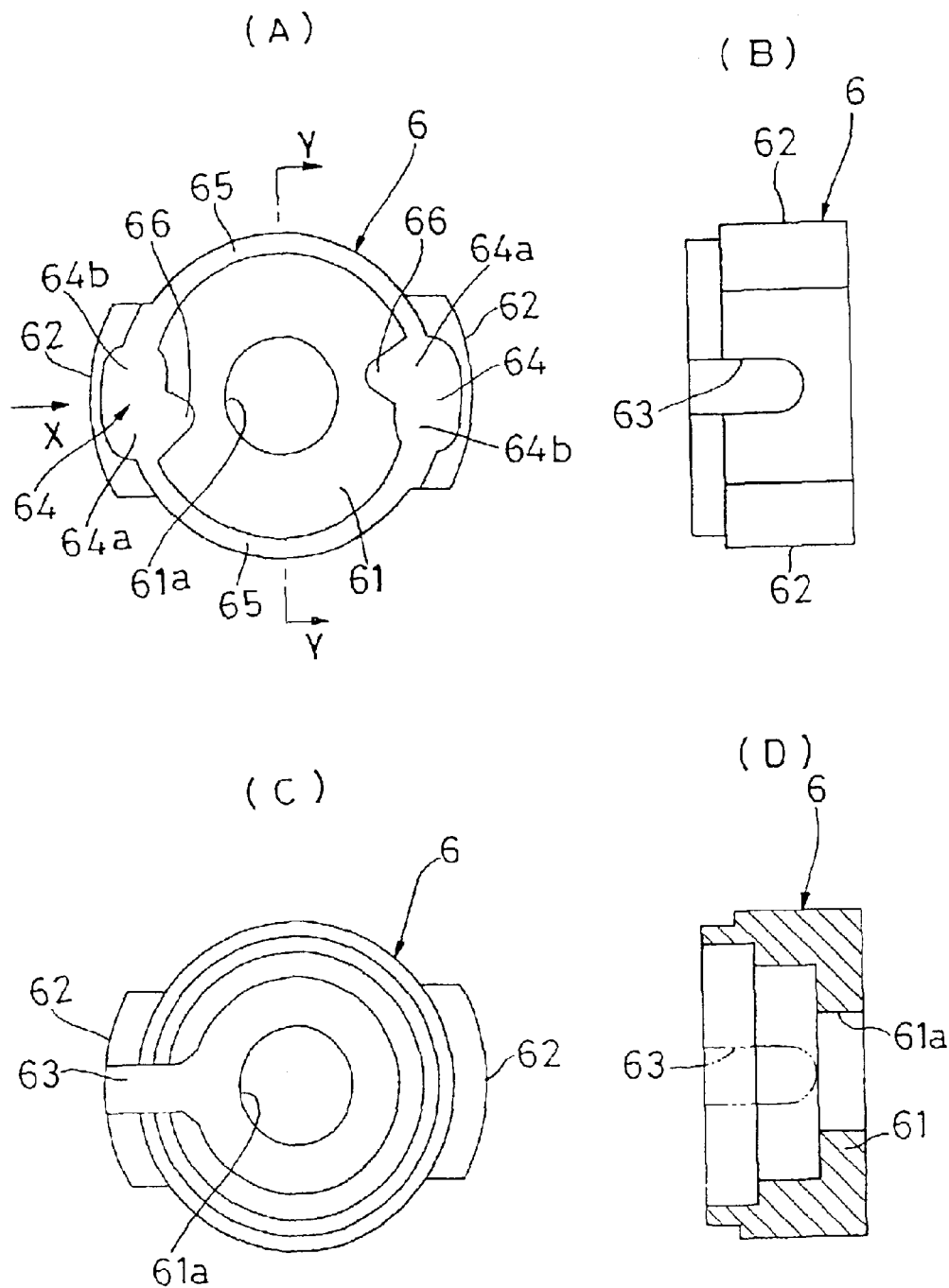
FIG. 12 is a view showing a movable member of the hinge assembly according to the present invention.

The movable member 6, as shown in FIG. 12, is of a short circular cylindrical configuration and has a bottom portion 61 at one end portion thereof. The movable member 6 is inserted in the open side end portion of the connection sleeve 2 with the bottom portion 61 directed towards the first hinge retainer D side. A pair of guide portions 62, 62 extending along the rotation axis L are formed on the outer peripheral surface of the movable member 6. By slidingly movably fitting the guide portions 62, 62 into the guide grooves 24, 24 formed the open portion side end portion of the connection sleeve 2, the movable member 6 is connected to the connection sleeve 2 such that the movable member 6 is non-turnable but movable in the direction of the rotation axis L. Accordingly, the movable member 6 is turned together with the reception section C. A throughhole 61a having a circular configuration in section is formed in the central portion of the bottom portion 61 of the movable member 6. The shaft portion 42 of the connection shaft 4 is turnably and slidingly movably pierced into the throughhole 61a.

The coiled spring 5 is received in a circular cylindrical space surrounded with the inner peripheral surface and the bottom portion 31 of the receiving sleeve 3, the outer peripheral surface of the shaft portion 42 of the connection shaft 4 and the inner peripheral surface and the bottom portion 61 of the movable member 6. One end portion 51 of this coiled spring 5 is retained by a retaining groove 41a (see FIG. 11(B)) formed in the head portion 41 of the connection shaft 4 such that the one end portion 51 is non-turningly displaceable in the circumferential direction about the rotation axis L. The other end portion 52 of the coiled spring 5 is retained by a retaining groove 63 (see FIG. 12) formed in the movable member 6 such that the other end portion 52 is non-turningly displaceable in the circumferential direction about the rotation axis L. Moreover, the coiled spring 5 is twisted. Accordingly, the coiled spring 5 turn biases the connection shaft 4 and the movable member 6 such that the connection shaft 4 and the movable member 6 are turned in the mutually opposite directions, thereby turn biasing the connection shaft 4 and the connection sleeve 2 such that the connection shaft 4 and the connection sleeve 2 are turned in the mutually opposite directions. In this case, the coiled spring 5 turn biases the connection sleeve 2 such that the connection sleeve 2 is turned from the closed position towards the open position side, thereby turn biasing the reception section C from the closed position towards the open position side. The one end portion 51 and the other end portion 52 of the coiled spring 5 are retained by the connection shaft 4 and the movable member 6 such that the coiled spring 5 is non-displaceable in the expanding direction of the coiled spring 5. The coiled spring 5 is compressed in the axial direction. Accordingly, the coiled spring 5 biases the movable member 6 from the connection sleeve 2 side towards the first hinge retainer D side. As apparent from this, the coiled spring 5 is used both as turn biasing means and direct acting biasing means. The turn biasing means and the direct acting biasing means may be provided separately. By using the connection sleeve 2 as the hinge shaft and by receiving the connection shaft 4 and the coiled spring 5 within the connection sleeve 2, the entire hinge assembly 1 is miniaturized.

Figure 13:
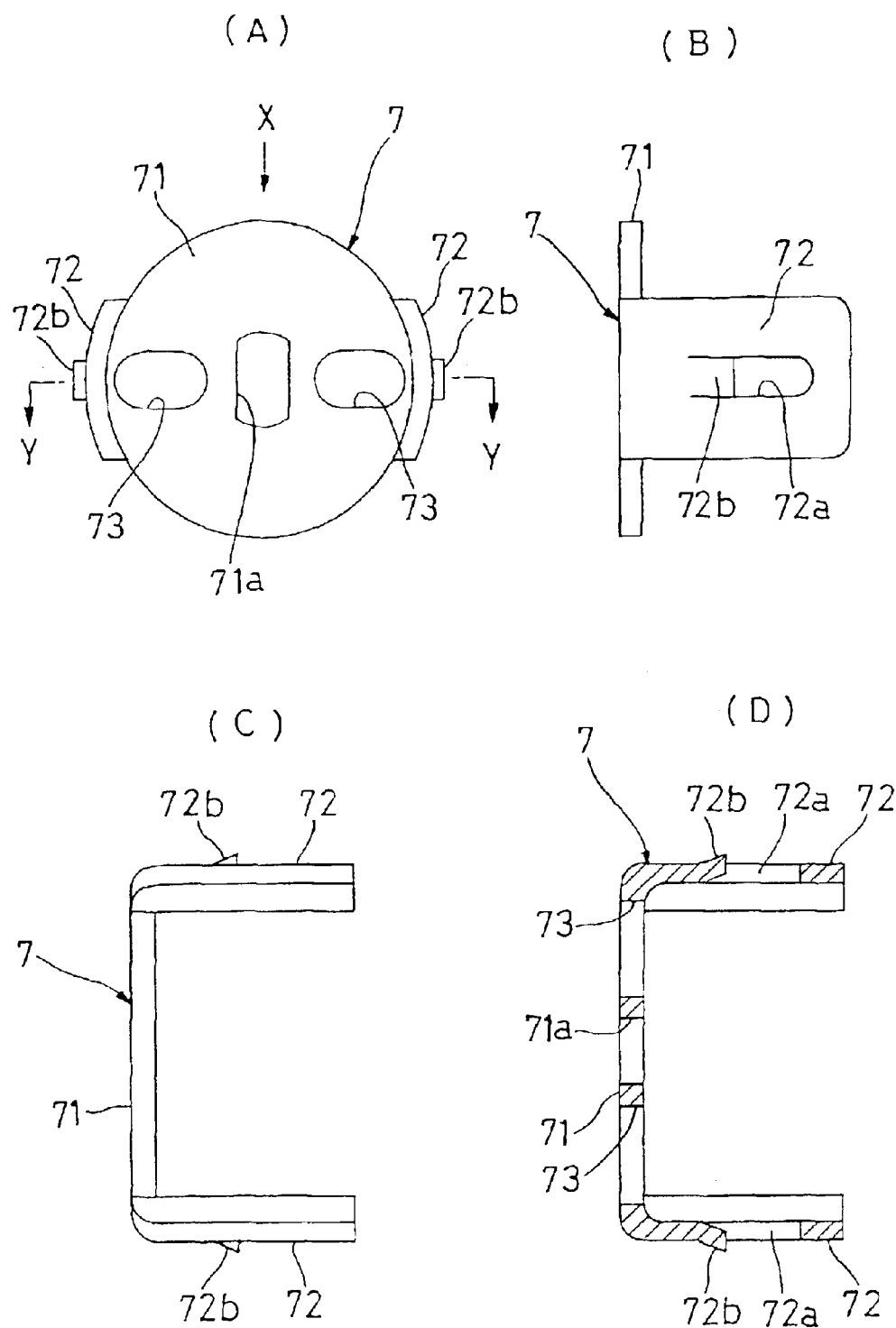
FIG. 13 is a view showing a fixed member of the hinge assembly according to the present invention.

The fixed member 7, as shown in FIGS. 8 and 13, includes a disc portion 71, and a pair of guide plate portions 72, 72 extending from the outer peripheral surface of the disc portion 71 in parallel with the rotation axis L. The fixed member 7, as shown in FIGS. 1 through 4, is inserted in the first hinge retainer D with the disc portion 71 placed inwards and with the guide plate portion 72 extending outwards. The pair of guide portions 72, 72 are slidingly movably fitted into the corresponding guide grooves Db, Db of the first hinge retainer D. Owing to this arrangement, the fixed member 7 is non-turnably connected to the first hinge retainer D. A throughhole 71a is formed in the central portion of the disc portion 71 of the fixed member 7. This throughhole 71a has a generally same configuration and a generally same dimension as the double face portion 45 of the connection shaft 4. The double face portion 45 is non-turnably but slidingly movably pierced into the throughhole 71a. Accordingly, the fixed member 7 is non-turnably connected with respect to the connection shaft 4. Thus, the fixed member 7, and the connection shaft 4 and the receiving sleeve 3 which are non-turnably connected to the fixed member 7, are turned together with the transmission section B. That is, they are relatively turned with respect to the reception section C. Although the fixed member 7 is movably connected with respect to the connection shaft 4 in the direction of the rotation axis L, it is hardly moved in that direction as later described.

Figure 14:
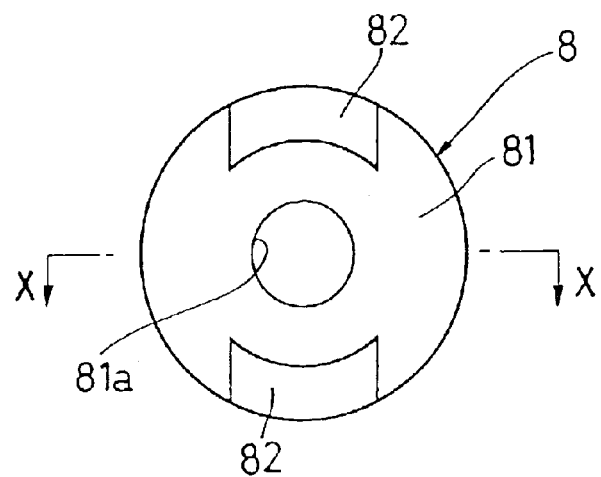
FIG. 14 is a view showing a cam member of the hinge assembly according to the present invention.
Figure 14:
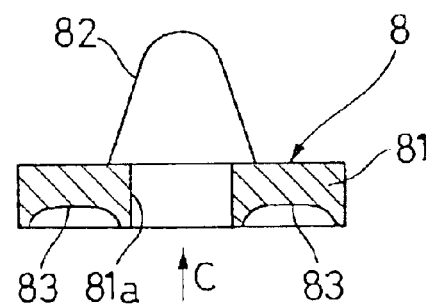
Figure 14:
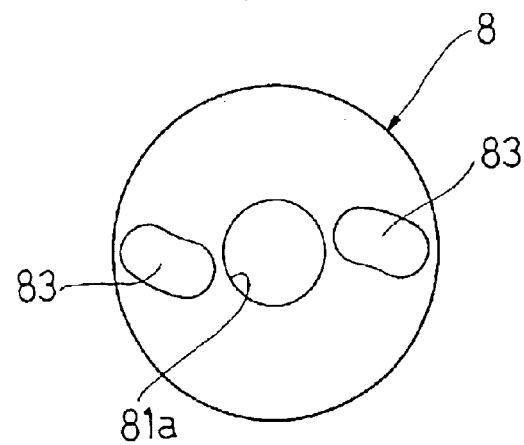
Figure 15:
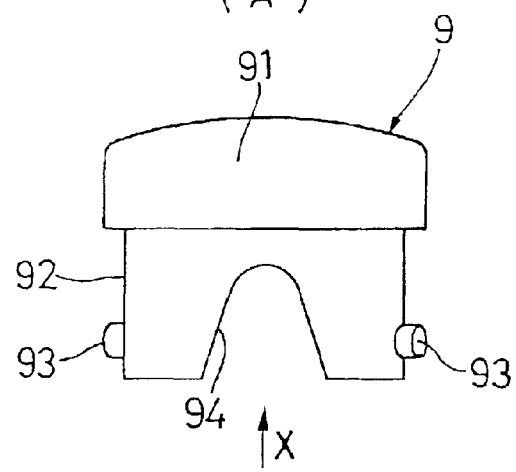
FIG. 15 is a view showing the control button of the hinge assembly according to the present invention.
Figure 15:
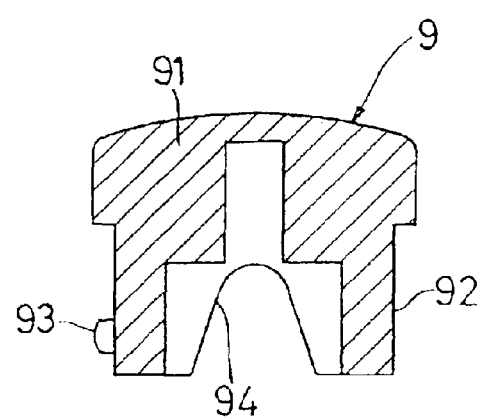
Figure 15:
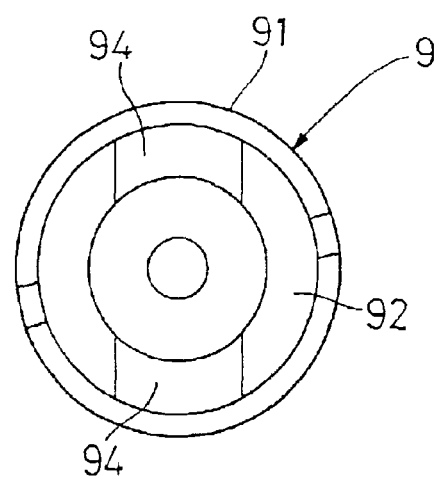

The cam member 8, as shown in FIGS. 8 and 14, includes a disc-like basal portion 81 and a pair of cam portions 82, 82 formed on the outer periphery side of one end face of the basal portion 81. A throughhole 81a having a circular configuration in section is formed in the central portion of the basal portion 81. The double face portion 45 is turnably pierced into the throughhole 81a. The total thickness of the basal portion 81 and the disc portion 71 of the fixed member 7 is very slightly smaller than the length of the double face portion 45. Accordingly, when a nut 102 (see FIG. 8) is threadingly engaged with the screw portion 43 and tightened, the cam member 8 and the fixed member 7 hardly movably assembled to the double face portion 45 in the direction of the rotation axis L. As a consequence, the connection shaft 4, the coiled spring 5, the movable member 6, the fixed member 7, the cam member 8 and the nut 102 are unitized. The nut 102 is omitted in FIGS. 1 through 3.

The unitized connection shaft 4 through the nut 102 (hereinafter referred to as the "unit member"), the connection sleeve 2 and the receiving sleeve 3 are mounted on the first through third hinge retainers D, E, F such that they are prevented from escaping, in the following manner. That is, a guide hole 72a extending in parallel with the rotation axis L is formed in the guide plate portion 72 of the fixed member 7. A locking claw 72b protruding towards the outer periphery side of the guide portion 72 is formed on the outer peripheral surface of the guide portion 72 facing that end portion of the guide hole 72a which is located on the disc portion 71 side. When the fixed member 7 is inserted into the first hinge retainer D, the locking claw 72b is elastically deformed towards radially inwards, thereby permitting the fixed member 7 to be inserted into the first hinge retainer D. However, once the fixed member 7 is inserted into the first hinge retainer D, a forward end portion of the locking claw 72b is protruded radially outwards by elasticity of the locking claw 72b itself and bitten into the inner peripheral surface of the first hinge retainer D. By this, the fixed member 7 is prevented from escaping. Accordingly, the receiving sleeve 3 is inserted into the connecting sleeve 2, the unit member is inserted into the receiving sleeve 3 and then they are inserted into the third hinge retainer F through the first hinge retainer 7, when the connection sleeve 2 is brought into abutment with the end face of the second hinge retainer E, the connection sleeve 2, the receiving sleeve 3 and the unit member becomes unable to move any further in the above-mentioned direction. On the other hand, the locking claw 72b is bitten into the inner peripheral surface of the first hinge retainer D, thereby prohibiting them from moving in the opposite direction. As a consequence, the connection sleeve 2, the receiving sleeve 3 and the unit member are mounted on the first through third hinge retainers D, E, F such that they are prevented from escaping.

The hinge assembly 1 includes a locking mechanism for maintaining the reception section C in the closed position against the biasing force of the coiled spring 5 and a lock releasing mechanism for turning the reception section C from the closed position into the open position by the biasing force of the coiled spring 5, by releasing the locked state achieved by the locking mechanism.

First, the locking mechanism is described. As shown in FIGS. 1 through 3 and 13, a pair of slots (guide grooves) 73, 73 are formed in the disc portion 71 of the fixed member 7. The pair of slots 73, 73 extend on a line (radial line of the disc portion 71) orthogonal to the rotation axis L and are arranged in point symmetric relation about the rotation axis L. A spherical body (engagement member) 10 made of steel material is mounted in each slot 73. The spherical body 10 has a generally same outside diameter as the width of the slot 73 and is mounted in the slot 73 such that the spherical body 10 is rollable and movable in the longitudinal direction. The outside diameter of the spherical body 10 is larger than the thickness of the disc portion 71. Accordingly, one side portion of the spherical body 10 in the direction of the rotation axis L protrudes from the slot 73 towards the movable member 6 side and the other side portion of the spherical body 10 protrudes from the slot 73 towards the cam member 8 side. Thus, the bottom portion 61 of the movable member 6 and the basal portion 81 of the cam member 8 are abutted with one and the other side portions of the spherical body 10 by the biasing force of the coiled spring 5.

As shown in FIGS. 1 through 3, 12 and 16, a pair of engagement recesses 64, 64 are formed in the end face of the bottom portion 61 of the movable member 6 which is in opposing relation to the fixed member 7. The pair of engagement recesses 64, 64 are arranged 180 degrees away from each other in the circumferential direction about the rotation axis L and extended in the circumferential direction. When the reception section C is located in the closed position and the spherical body 10 is located at the end portion on the outer periphery side of the slot 73, the spherical body 10 is brought into one end portion (locking portion) 64a of the engagement recess 64 in the longitudinal direction (the circumferential direction). The pair of engagement recesses 64, 64 are connected to each other through guide grooves 65, 65 extending in the circumferential direction. Accordingly, presuming that the reception section C is turned from the closed position towards the open position side and the movable member 6 is turned in the direction as indicated by an arrow Z of FIG. 16 following the movement of the reception section C and as a result, the spherical body 10 is brought out of one of the engagement recesses 64, the spherical body 10 is rollingly moved within the guide groove 65 towards the other engagement recess 64 side. When the reception section C reaches the open position, the spherical body 10 is brought into the other end portion 64b of the engagement recess 64.

Figure 16:
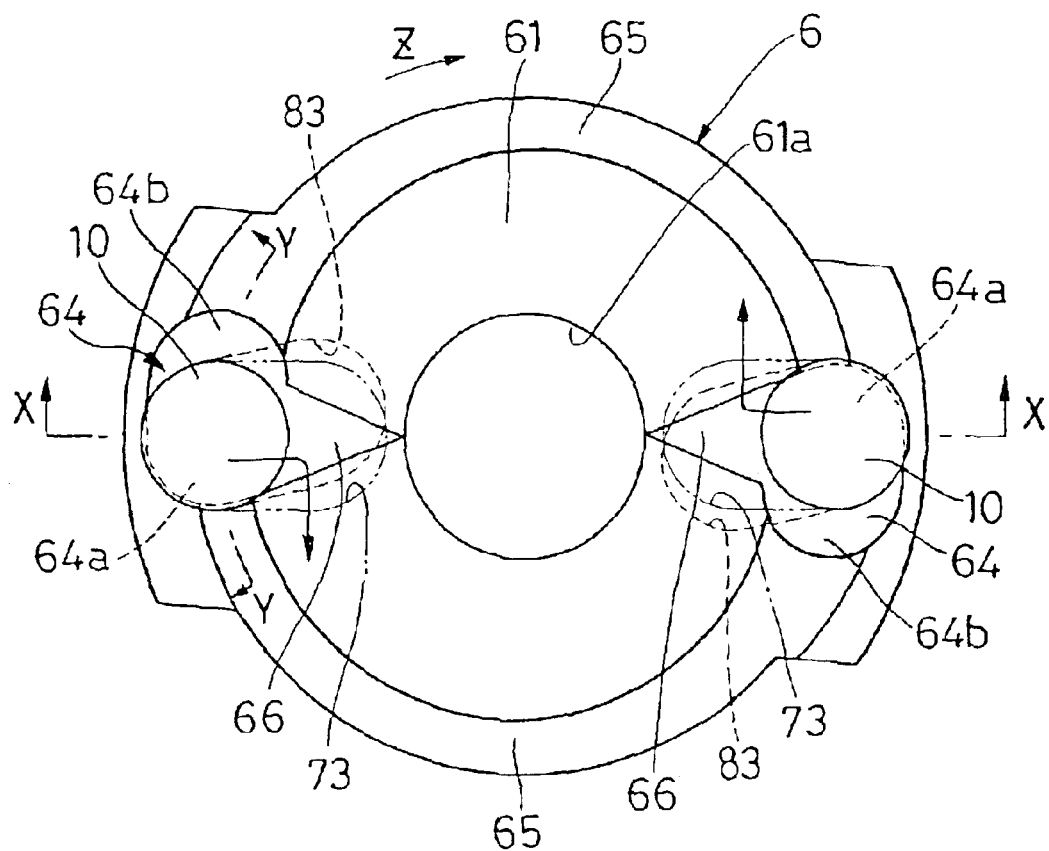
FIG. 16 is an enlarged plan view of the movable member shown in FIG. 12.

In the state that the spherical body 10 brought into one end portion 64a of the engagement recess 64, the spherical body 10 is abutted with a wall surface which defines the one end portion 64a, thereby prohibiting the movable member 6 from turning in the direction as indicated by an arrow Z of FIG. 16. On the other hand, the coiled spring 5 biases the movable member 6 so as to be turned in the direction as indicated by the arrow Z. However, the height (distance from the bottom portion of the one end portion 64a to the end face of the movable member 6 on the fixed member 7 side) of the wall surface which constitutes the one end portion 65a, is high and the force, which is generated by abutment of the one end portion 64a with the spherical body 10, for prohibiting the movable member 6 from turning into the direction as indicated by the arrow Z is larger than the turn biasing force of the coiled spring 5 in the direction as indicated by the arrow Z. For this reason, the biasing force of the coiled spring 5 is unable to cause the spherical body 10 to override the one end portion 64a and therefore, the movable member 6 is unable to turn in the direction as indicated by the arrow Z. Thus, the reception section C is maintained in the closed position.

Next, the locking mechanism is described. As shown in FIG. 14, a pair of driving recesses 83, 83 are formed in the surface of the basal portion 81 of the cam member 8 which is placed opposite the disc portion 71. The pair of driving recesses 83, 83 are arranged in point symmetrical relation with respect to the rotation axis L and extended slantwise generally arcuately with respect to a radial line orthogonal to the rotation axis L. Moreover, as shown in FIG. 16, the driving recess 83 is arranged such that when the reception section C is located in the closed position, the other end portion of the spherical body 10 protruding from the slot 73 is brought into the outer end portion of the driving recess 83.

In the state that the reception section C is located in the closed position, when the cam member 8 is turned in one direction, the driving recess 83 co-acts with the slot 73 to move the spherical body 10 towards the inner periphery side of the slot 73. The reason is that the slot 73 extends on the line orthogonal to the rotation axis L, while the driving recess 83 extends slantwise with respect to the line orthogonal to the rotation axis L. When the cam member 8 is turned in the other direction after the spherical body 10 is moved towards the inner side, the driving recess 83 co-acts with the slot 73 to move the spherical body 10 towards the outer periphery side. Whether the spherical body 10 is moved towards the inner or outer periphery side when the cam member 8 is turned in one or the other direction depends on the slanting direction of the driving recess 83.

A control button 9 is inserted in the end portion on the outer side (opposite side of the third hinge retainer F) of an enlarged diameter hole portion Da of the first hinge retainer D. The control button 9, as shown in FIGS. 1 through 4, 8 and 15, includes a disk-like head portion 91 and a circular cylindrical portion 92 having a circular cylindrical configuration in section. The head portion 91 and the circular cylindrical portion 92 are coaxially formed. One end portion of the head portion 91 is inserted in the enlarged diameter hole portion Da of the first hinge retainer D such that the head portion 91 is movable in the direction of the rotation axis and the other end portion is protruded outside from the first hinge retainer D. Accordingly, the control button 9 can be pressed from the outside of the first hinge retainer D towards the inside. From the original position (the first position) shown in FIG. 1 to the position where the head portion 91 is abutted with the bottom surface Dc of the enlarged diameter portion Da, the control button 9 can move towards the inner side of the first hinge retainer D (it should be noted, however, that the head portion 91 is, in actual practice, never moved so far as to be abutted with the bottom surface Dc). The circular cylindrical portion 92 is inserted between the pair of guide portions 72, 72 of the fixed member 7 such that the circular cylindrical portion 92 is movable in the direction of the axis L. A pair of guide projections 93, 93 are formed on the outer peripheral surface of the circular cylindrical portion 92. Each guide projection 93 is inserted in a guide hole 72a formed in the guide portion 72 such that the guide projection 93 is movable in the longitudinal direction of the guide hole 72. Owing to this arrangement, the control button 9 is movably but non-turnably connected with respect to the fixed member 7 and is prevented from escaping therefrom.

A cam groove 94 having a generally same configuration as the cam portion 82 of the cam member 8, is formed in the circular cylindrical portion 92. This cam groove 94 is disposed at a location slightly displaced in the circumferential direction with respect to the cam portion 82. Accordingly, when the control button 9 is pressingly moved towards the cam member 8 side, one side surface of the cam groove 94 is brought into abutment with one side surface of the cam portion 82 of the cam member 8. When the control button is further pressingly moved, the cam member 8 is turned in one direction about the rotation axis L. Thus, in the state that the spherical body 10 is located at the outer periphery side end portions of the slot 73 and the driving recess 83, when the control button 9 is pressingly moved, the spherical body 10 is moved towards the inner periphery side.

Figure 17:
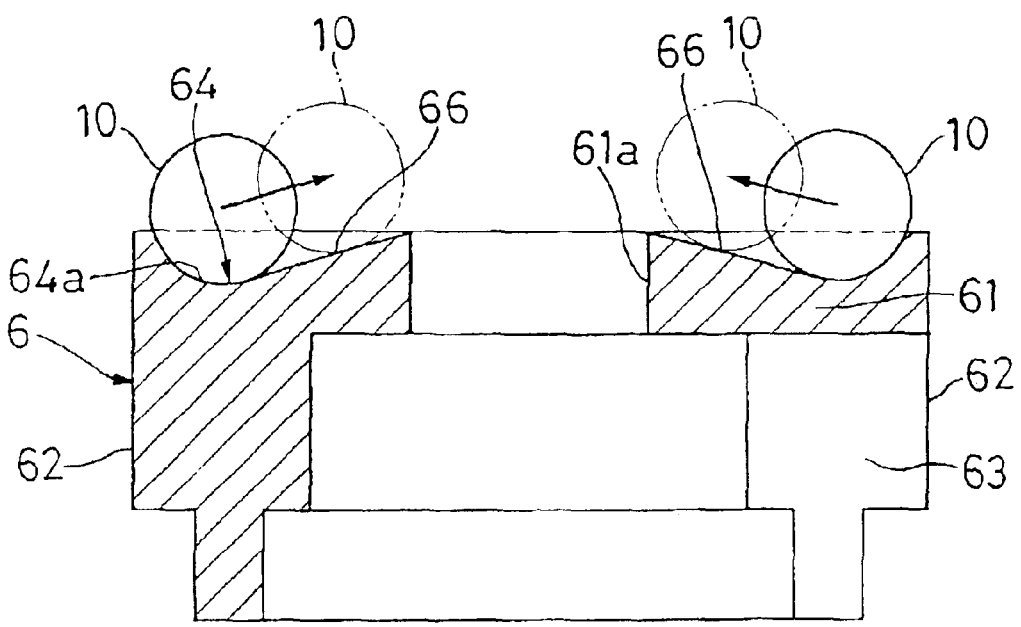
FIG. 17 is a sectional view taken on line X—X of FIG. 16.

As shown in FIGS. 16 and 17, a pair of inclination recesses 66, 66 are formed in the opposing surface of the bottom portion 61 of the movable member 6 with respect to the fixed member 7. The pair of inclination recesses 66, 66 are continuous with inner peripheral portions of one end portions 64a of the respective engagement recesses 64 and further extend towards the inner periphery side therefrom. The outer periphery side of the bottom surface of the inclination recess 66 is smoothly continuous with the bottom surface of the one end portion 64a of the engagement recess 64 and the bottom surface of the inclination recess 66 is slanted towards the fixed member 7 side as it further extends towards the inner periphery side therefrom. As a result, the depth of the inclination recess 66 is gradually reduced towards the high parts at the inner periphery side from the low parts at the outer periphery side. Owing to this feature, when the spherical body 10 is moved towards the inner periphery side of the inclination recess 66, it can escape from the inclination recess 66 by the biasing force of the coiled spring 5. The second position is the position of the control button 9 at the time the control button 9 is pressingly moved until the spherical body 10 can escape from the inclination recess 66 by the biasing force of the coiled spring 5. When the spherical body 9 is escaped from the inclination recess 66, the movable member 6 and the connection sleeve 2 are turned by the biasing force of the coiled spring 5 and as a result, the reception section C is turned from the closed position towards the open position side.

Next, operation of the hinge assembly thus constructed is described. For the sake of convenience of explanation, it is presumed here that the reception section C of the cellular telephone A is turned with respect to the transmission section B. Now, presume that the reception section C is located in the closed position and the control button 9 is located in the original position. In that state, the spherical body 10 is brought into the one end portion 64a of the engagement recess 64. Accordingly, the movable member 6 is unable to turn in the direction as indicated by the arrow Z, by the biasing force of the coiled spring 5. Thus, the reception section C is maintained in the closed position.

When the control button 9 is pressingly moved towards the inner side of the first hinge retainer D, the cam member 8 is turned in one direction. Then, the spherical body 10 is moved towards the inner periphery side, brought out of the one end portion 64a and brought into the inclination recess 66, and then moved towards its inner periphery side. When the control button 9 is moved to the second position, the spherical body 10 is moved to the inner periphery side of the inclination recess 66. Since the depth of the inclination recess 66 is reduced at the inner periphery side, the spherical body 10 can escape from the inclination recess 66 by the turn biasing force of the coiled spring 5 (see FIGS. 16 and 21). When the spherical body 10 is brought out of the inclination recess 66, the movable member 6 is turned in the direction as indicated by the arrow Z, by the biasing force of the coiled spring 5 and the reception section C is turned to the open position side through the connection sleeve 2. At that time, under the effect of the viscous fluid filled between the connection sleeve 2 and the receiving sleeve 3, high-speed turn of the reception section C is prohibited and the reception section C is turned to the open position at a low speed. Moreover, since the reception section C is kept turn biased by the coiled spring 5 even after it reaches the position, it is maintained in the open position with no play.

Figure 22:
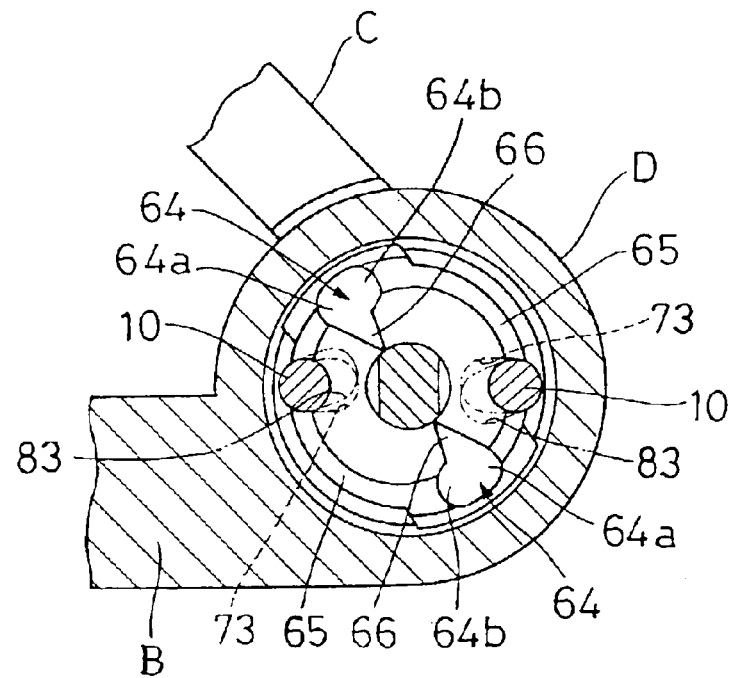
FIG. 22 is a sectional view, like FIG. 19, showing a state in which the reception section is turned about 45 degrees from the closed position.
Figure 23:
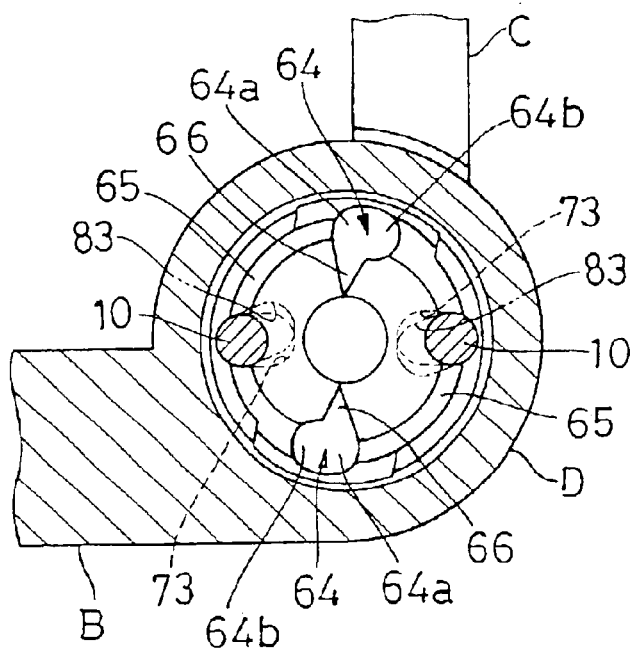
FIG. 23 is a sectional view, like FIG. 22, showing a state in which the reception section is turned about 90 degrees from the closed position.
Figure 24:
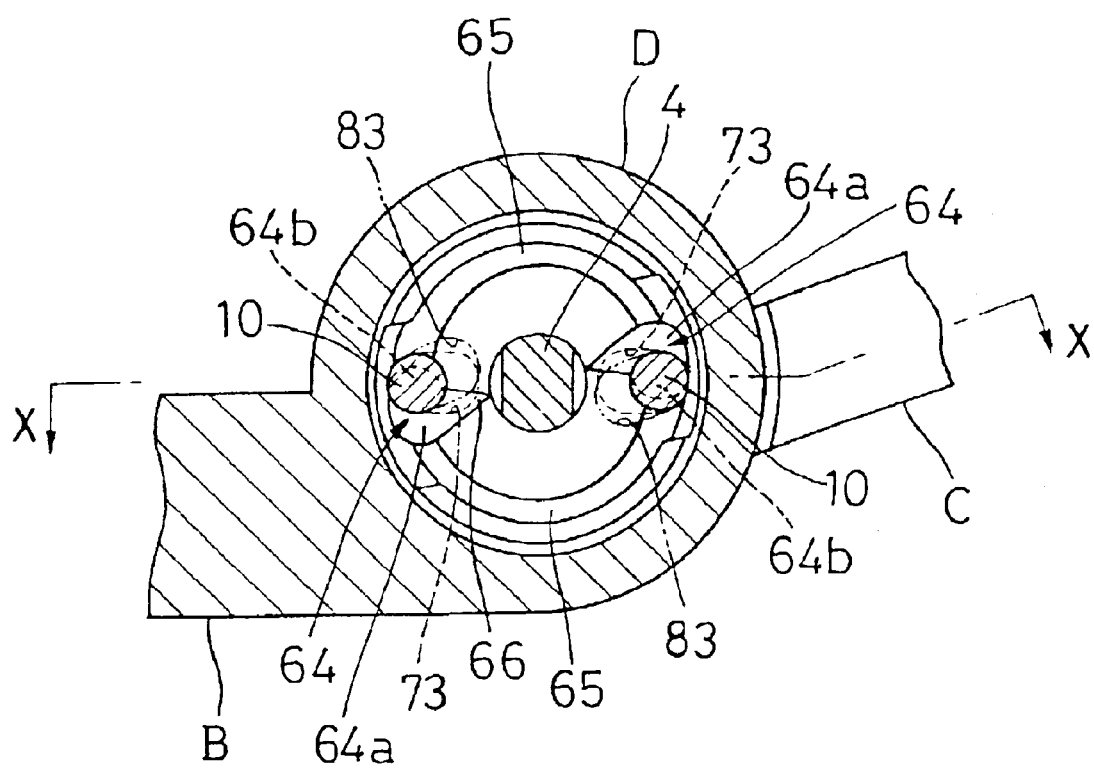
FIG. 24 is a sectional view, like FIG. 22, showing a state in which the reception section is turned into the open position.

When the cam member 8 is turned in one direction by pressing the control button 9 and the spherical body 10 is moved towards the inner periphery side of the inclination recess 66, the movable member 6 is moved against the direct acting biasing force (biasing force directing along the rotation axis L) because the inclination recess 66 is reduced in depth at the inner periphery side. Accordingly, the control button 9 is pressed against the direct acting biasing force of the coiled spring 5. When the hand is removed from the control button 9 after the spherical body 10 is brought out of the inclination recess 66, the spherical body 10 is moved in the direction orthogonal to the radial line as indicated by a bold solid line in FIG. 16. When the movable member 6 is turned by a predetermined angle (for example, about 45 degrees), the spherical body 10 is, as shown in FIG. 22, brought into the guide groove 65. As a consequence, the cam member 8 is turned into the original position by the biasing force of the coiled spring 5 and the control button 9 is pushed back into the original position (first position). Thereafter, as shown in FIG. 23, when the spherical body 10 is rollingly moved within the guide groove 65. Then, as shown in FIG. 24, the reception section C reaches the open position and stops.

Figure 18:
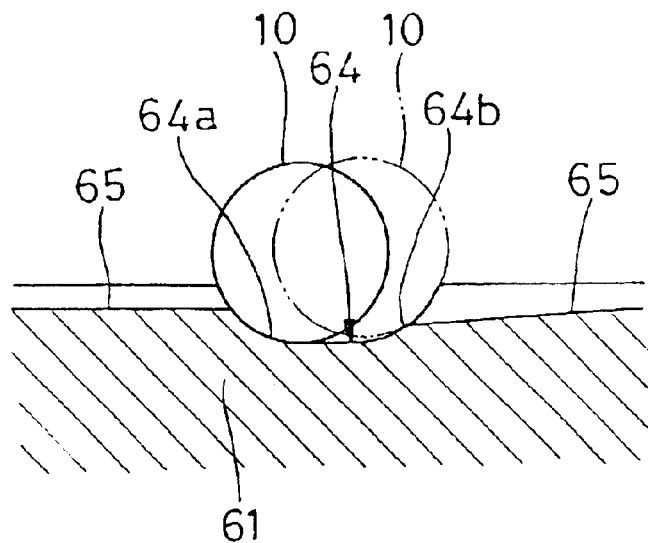
FIG. 18 is a sectional view taken on line Y—Y of FIG. 16.
Figure 19:
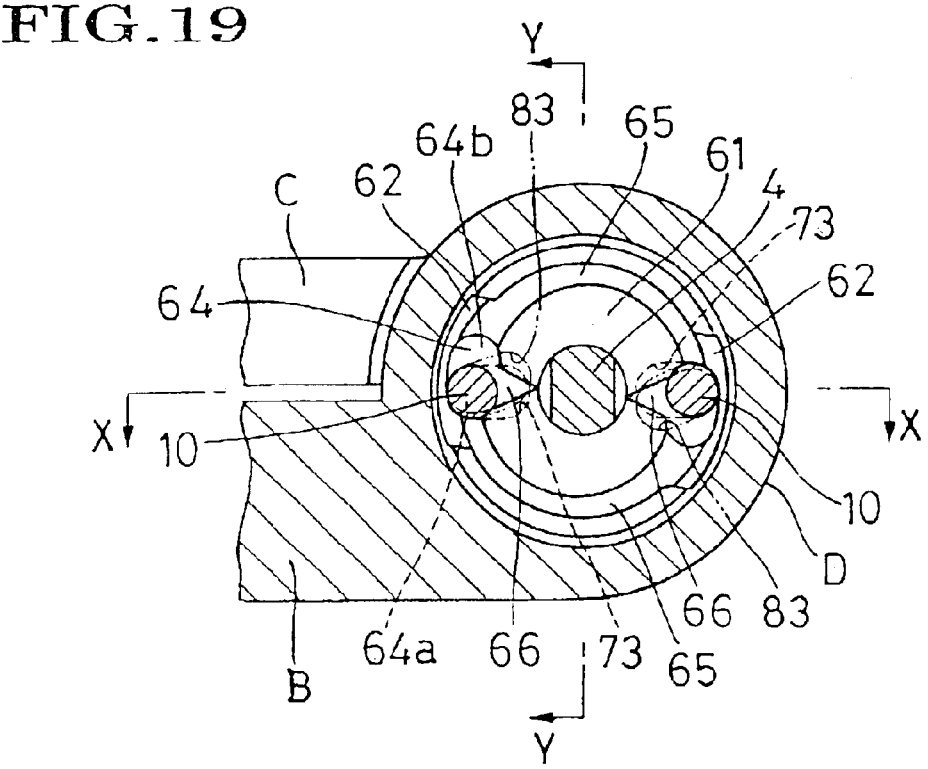
FIG. 19 is a sectional view taken on line X—X of FIG. 1.
Figure 20:
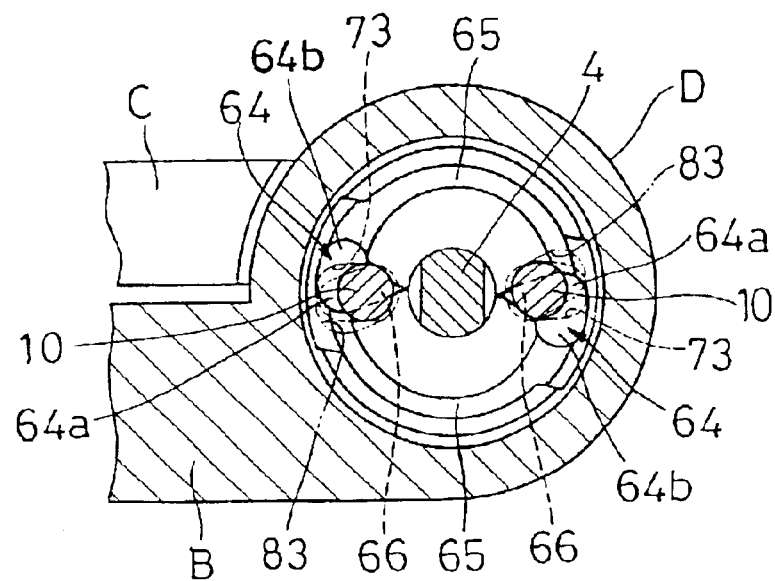
FIG. 20 is a sectional view taken on line X—X of FIG. 2.
Figure 21:
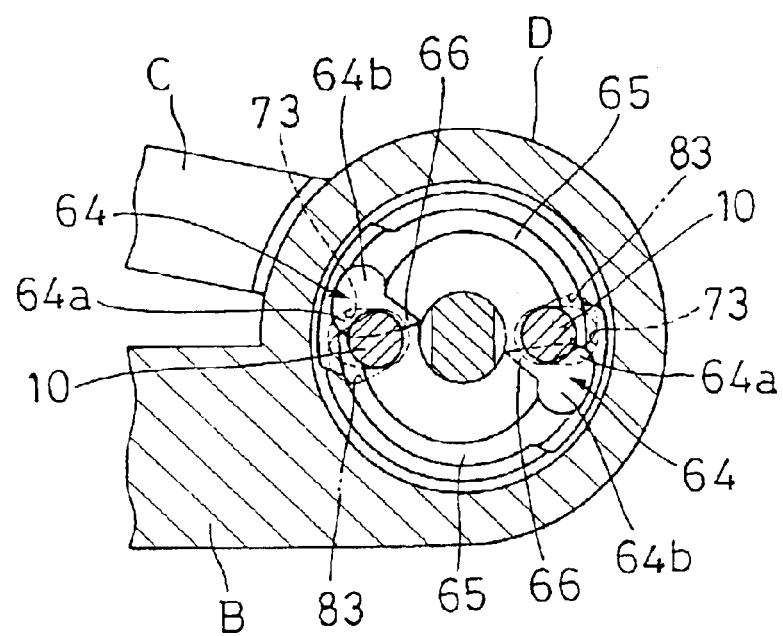
FIG. 21 is a sectional view, like FIG. 20, showing a state in which the reception section is turned about 5 to 10 degrees from the closed position.

In order to return the reception section C, which has been turned into the open position, the reception section C is manually turned from the open position towards the closed position side. At that time, as shown in FIG. 18, the guide groove 65 is increased in depth at the other end 64b side of the engagement recess 64 and a step formed between the other end portion 64b and the guide groove 65 is reduced. Accordingly, the spherical body 10 can easily be brought out of the other end portion 64b and brought into the guide groove 65. Thus, the reception section C can be turned from the open position towards the closed position side without incurring a large turning force to the reception section C. When the reception section C reaches the closed position, the entire hinge assembly 1 is returned into the original position shown in FIG. 1 and the reception section C is maintained in the closed position.

When the reception section C located in the closed position is manually turned towards the open position side without pressing the control button 9, the spherical body 10 moves on the movable member 6 against the direct acting biasing force of the coiled spring 5 and is brought out of the one end portion 64a of the engagement recess 64 and brought into the guide groove 65. Then, the reception section C is turned to the open position by the biasing force of the coiled spring 5.

In the above-mentioned hinge assembly 1, since the portion for turning the reception section C and the portion for locking the reception section C to the closed position are integrally assembled, the number of parts and the time and labor for assembly can be reduced, and the manufacturing cost can be reduced to that extent. Moreover, in the hinge assembly 1 of this embodiment, since a circular cylindrical connection sleeve 2 is used as the hinge shaft and the connection shaft 4, the coiled spring 5, etc. are receiving in the connection sleeve 2, the entire hinge assembly can be miniaturized. Moreover, the reception section C can forcibly be turned from the closed position towards the open position side without pressing the control button 9. Accordingly, the locking mechanism can be prevented from being broken which would otherwise occur by the forcible turning operation of the reception section C.

It should be noted that the present invention is not limited to the above embodiment but many changes and modifications can be made in accordance with necessity.

For example, in the above-mentioned embodiment, although a recess (one end portion 64a of the engagement recess 64a and the inclination recess 66) is used as a locking portion, a wall surface, which is reduced in height from the outer periphery side towards the inner periphery side, may be used as the locking portion. Moreover, although the height of the locking portion (the depth of the recesses 64a, 66) is dimensioned to be high (deep) at the outer periphery side and low (shallow) at the inner periphery side, the revered arrangement is also accepted. In that case, it may be arranged such that when the control button 9 is pressed, the spherical body 10 is moved from the inner periphery side towards the outer periphery side.

Moreover, in the above-mentioned embodiment, although the driving recess 83 is arcuately slanted with respect to the radial line, it may be linearly slanted.

Industrial Applicability

A hinge assembly according to the present invention can be used as a hinge capable of turning a reception section of a foldable cellular telephone from the closed position to the open position with respect to a transmission section by one-touch operation.

What is claimed is:

1. A hinge assembly comprising a hinge shaft for turnably connecting two articles about a rotation axis between a closed position and an open position, a first hinge member disposed at one of said two articles such that said first hinge member is non-turnable and non-movable in the direction of said rotation axis with respect to said one article and is turnable but non-movable in the direction of said rotation axis with respect to said hinge shaft, a second hinge member placed opposite said first hinge member in the direction of said rotation axis and disposed at the other article such that said second hinge member is non-turnable but movable in the direction of said rotation axis with respect to said the other article and is non-turnable but movable in the direction of said rotation axis with respect to said hinge shaft, turn biasing means disposed between said two articles and for turn biasing said two articles from the closed position side towards the open position side, a locking mechanism for non-turnably locking said first and second hinge members so that said two articles are located in the closed position, and a lock releasing mechanism for releasing the locked states of said first and second hinge members caused by said locking mechanism and allowing turning of said first and second hinge members, wherein said locking mechanism includes a plurality of engagement members disposed between said first hinge member and said second hinge member in such a manner as to be away from each other in the circumferential direction about said rotation axis, and direct acting biasing means for biasing said second hinge member towards said first hinge member side along said rotation axis and pressing said second hinge member against said first hinge member through said engagement members, said first hinge member is provided with guide portions for connecting said engagement members to said first hinge member such that said engagement members are non-turnable but movable in the radial direction, and said second hinge member is provided with locking portions having high parts towards said first hinge member side and low parts away from said first hinge member side, said engagement members being locked by high parts of said locking portions, thereby preventing said first and second binge members from turning from said closed position towards said open position side, and wherein said lock releasing mechanism includes a control member which is externally controllable between a first position and a second position, and movement means for moving said engagement members from a high part side towards a low part side of said locking portions in accordance with movement of said control member from said first position towards said second position side, said engagement members being able to override said locking portions on the low side of said locking portions by biasing force of said turn biasing means.

2. A hinge assembly according to claim 1, wherein each of said engagement members is formed of a spherical body.

3. A hinge assembly according to claim 2, wherein said guide portions are formed as slots extending on a radial line orthogonal to said rotation axis, and said engagement members are received in said slots such that said engagement members are non-movable in a short direction of said slots but movable in a longitudinal direction of said slots.

4. A hinge assembly according to claim 3, wherein a thickness of said first hinge member in the direction of said rotation axis at least at that areas where said slots are formed, are smaller than a length of said engagement members in the direction of said rotation axis, one part of said engagement members projects from said slot towards said second hinge member side and the other part of said engagement members projects from said slot towards the opposite side, said movement means includes a cam member disposed at the opposite side of said second hinge member with respect to said first hinge member and turned about said rotation axis by movement of said control member from the first position to the second position, said cam member has a driving recess formed in a surface opposite said first hinge member, said driving recess being slanted with respect to a radial line of said first hinge member and co-acted with said slot to move said engagement member from the high part side towards the low part side of said locking portion at the time of turning of said cam member.

5. A hinge assembly according to claim 1, wherein said guide portions are formed as slots extending on a radial line orthogonal to said rotation axis, and said engagement members are received in said slots such that said engagement members are non-movable in a short direction of said slots but movable in a longitudinal direction of said slots.

6. A hinge assembly according to claim 5, wherein a thickness of said first hinge member in the direction of said rotation axis at least at that areas where said slots are formed, are smaller than a length of said engagement members in the direction of said rotation axis, one part of said engagement members projects from said slot towards said second hinge member side and the other part of said engagement members projects from said slot towards the opposite side, said movement means includes a cam member disposed at the opposite side of said second hinge member with respect to said first hinge member and turned about said rotation axis by movement of said control member from the first position to the second position, said cam member has a driving recess formed in a surface opposite said first hinge member, said driving recess being slanted with respect to a radial line of said first hinge member and co-acted with said slot to move said engagement member from the high part side towards the low part side of said locking portion at the time of turning of said cam member.

* * * * *